Feb. 4, 1969  W. N. LATHAM  3,425,585
SUPPORT SYSTEM FOR CRYOGENIC CONTAINERS
Filed May 24, 1967  Sheet 1 of 2
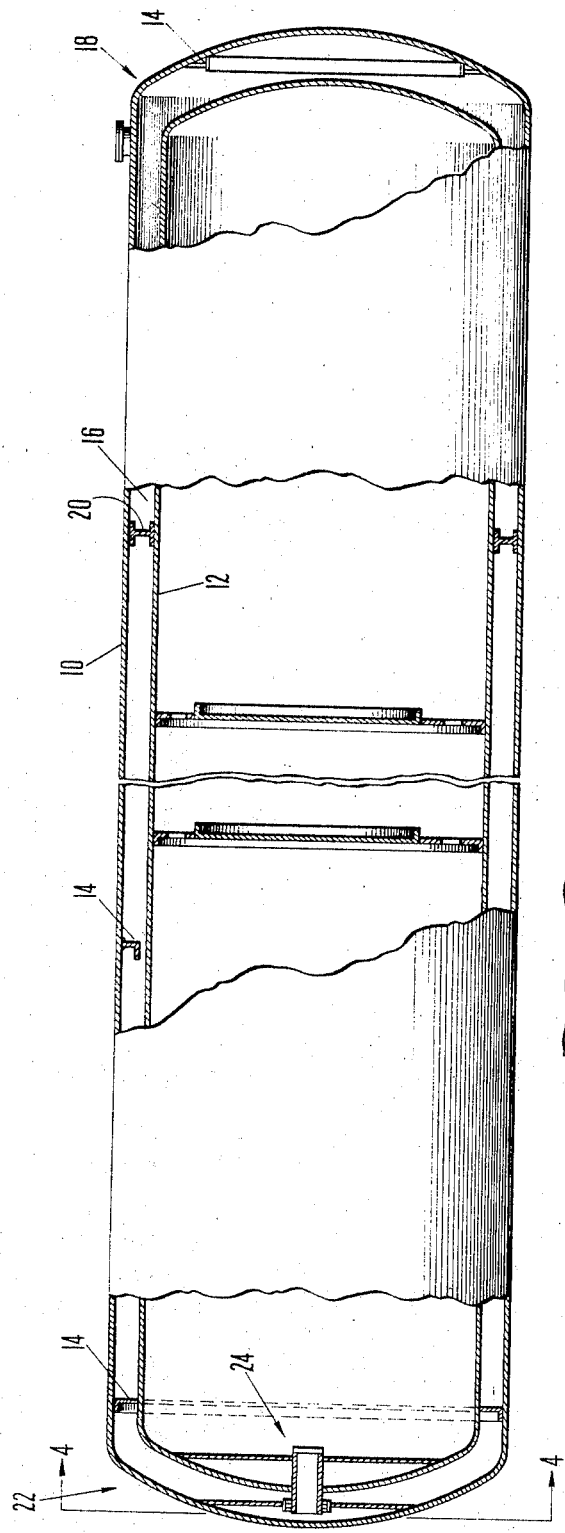
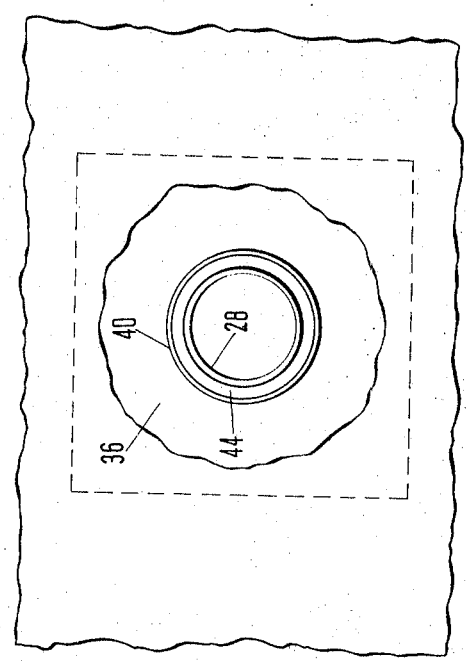
INVENTOR
WILLIAM NICHOLS LATHAM
BY
Wolf, Greenfield & Hieken

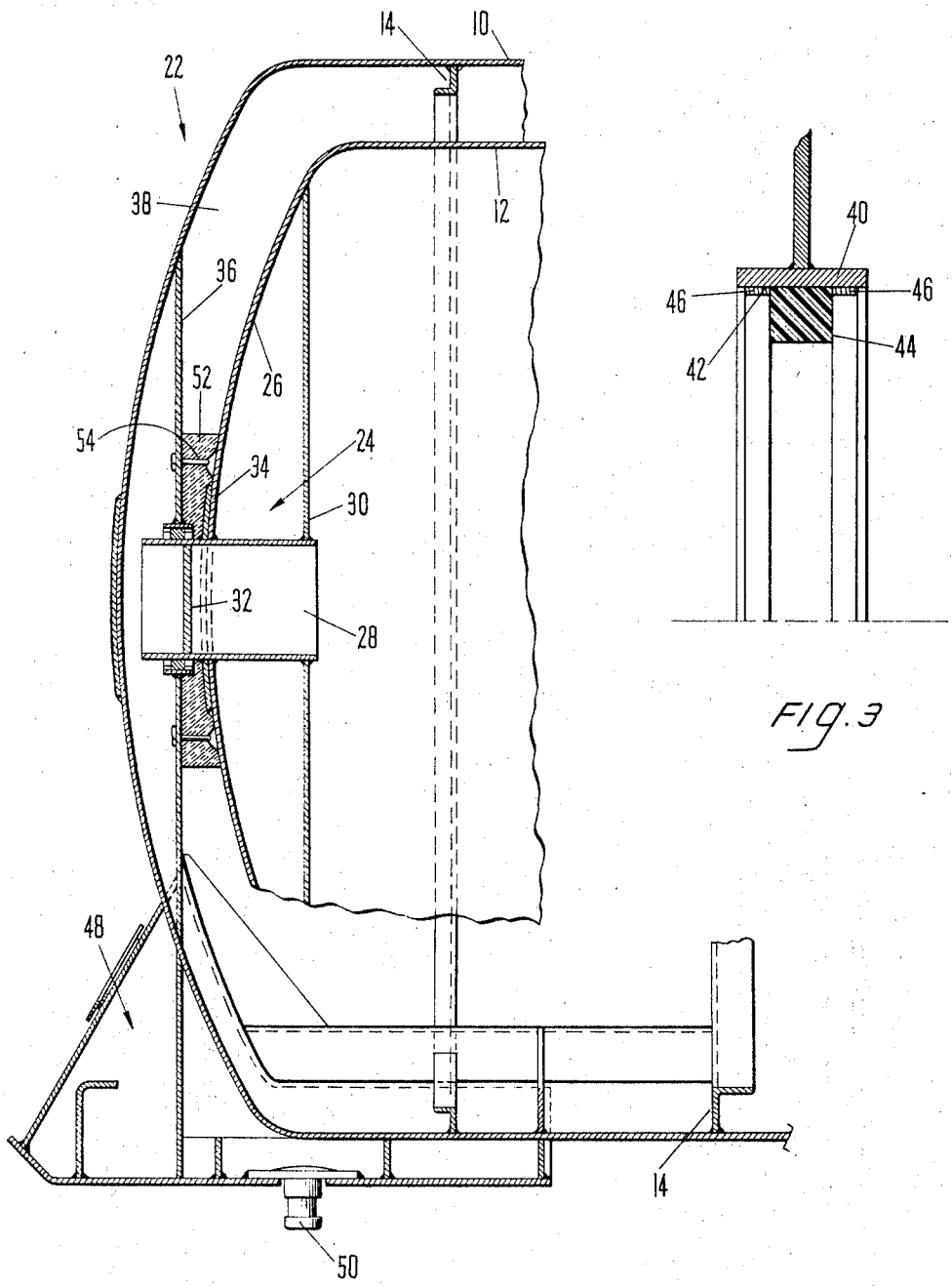

United States Patent Office 3,425,585
Patented Feb. 4, 1969

3,425,585
SUPPORT SYSTEM FOR CRYOGENIC
CONTAINERS
William Nichols Latham, Groveland, Mass., assignor to
Process Engineering Inc., Plaistow Village, N.H., a corporation of New Hampshire
Filed May 24, 1967, Ser. No. 640,961
U.S. Cl. 220—15                                    9 Claims
Int. Cl. B65d 25/02, 7/22, 9/28

ABSTRACT OF THE DISCLOSURE

An end support for the inner vessel of a cryogenic container wherein a support secured to the end of the inner vessel is slidable within a bearing carried by a diaphragm secured to the outer vessel. The slippage accommodates the relative motion of the vessels during cool-down, and the diaphragm accommodates relative motion when the inner vessel is loaded.

---

This invention relates to cryogenic containers and more particularly comprises a new and improved end support system for the inner vessel of a mobile cryogenic container.

In the design of support systems for cryogenic containers, several criteria must be considered. These include the weight of the system, the efficiency of the heat path between the inner and outer vessels of the container, and the mechanical load that must be borne by the support. For many applications and particularly for those applications in which the weight of the liquified gas is relatively high, it is essential to reduce the weight of the support system for the inner vessel so as to achieve maximum net capacity with minimum gross weight of the container. For mobile containers, the maximum gross weight is imposed by police regulations which limit the load tonnage on the highway. Therefore, because the maximum gross weight is controlled, to maximize the payload of a mobile unit it is necessary to reduce the weight of the system.

The temperature difference between the inner and outer vessels may be in the range of 400° F., and it is evident therefore that any effective heat conducting path between the outer and inner vessels will result in the evaporation and loss of the cryogenic liquid contents of the inner vessel and thereby impair the performance of the cryogenic container. Because the conductivity of material is directly proportional to its cross sectional area, the cross sectional area of the inner vessel support must be small to minimize its ability to conduct heat to the inner vessel.

The requirement that the support system be capable of bearing the mechanical load is rather obvious. However, the stresses to which the support systems are subjected are not so obvious. Certain stresses are caused by and occur during the shrinkage of the inner vessel during the cool-down period, while other stresses are imposed by relative movement of the inner and outer vessel caused by road motion etc. Thus, in designing the support system, adequate strength must be provided to sustain the mechanical load while the heat path and weight are minimized.

An important object of this invention is to provide an end support for the inner vessel of a cryogenic container which is relatively light weight and is a relatively poor heat conductor, and which also provides the mechanical strength necessary to absorb the normal stresses and loads which are imposed upon it.

Another important object of this invention is to provide an end support for the inner vessel of a cryogenic container which is relatively inexpensive to fabricate and easy to install.

To accomplish these and other objects, the end support for the inner vessel of cryogenic containers in accordance with this invention allows relative shifting of the inner vessel with respect to the outer vessel during cool-down without introducing stresses to the inner vessel walls and which takes up the axial displacements of the inner vessel with respect to the outer vessel after it is loaded such as occur during movement of the container. This is achieved by means of a slip bearing supported on a diaphragm secured to the outer vessel, which bearing receives a tube secured to the inner vessel. The tube is allowed to slip within the bearing when the inner vessel is relatively light, but when the vessel is loaded, the frictional engagement between the tube and the bearing causes any relative motion thereafter between the two vessels to be taken up by the diaphragm. During cool-down the end of the inner vessel may move as much as one inch or more with respect to the outer vessel, and the slippage between the bearing and the tube accommodates this change without imposing great stress on the support or walls of the vessel. Axial motion of the inner vessel caused by motion of the system or load shift is limited to a much smaller distance (a small fraction of the relative motion caused by cool-down), and the diaphragm is able to accommodate these temporary relative displacements.

These and other objects and features of this invention along with its incident advantages will be better understood and appreciated from the following detailed description of one embodiment thereof, selected for purposes of illustration and shown in the accompanying drawing, in which:

FIG. 1 is a side view, partly in section, of a cryogenic container constructed in accordance with this invention;

FIG. 2 is an enlarged fragmentary cross sectional view of the front end of the container shown in FIG. 1;

FIG. 3 is a cross sectional detail of the structure shown in FIG. 2; and

FIG. 4 is a cross sectional view taken along the corresponding section line in FIG. 1.

The container shown in FIG. 1 includes an outer vessel 10 and an inner vessel 12, both generally cylindrical in shape and closed at each end. The outer vessel 10 includes a plurality of stiffening rings 14 which prevent the outer container from buckling when the space 16 between the containers is evacuated. The inner vessel 12 is shown supported intermediate its ends about two-thirds to the rear 18 of the vessel by a support structure 20 and at the front of the container 22 by support structure 24. The support structure 24 is the subject matter of the present invention.

In FIGS. 2 to 4 the support structure 24 is shown in detail. The inner vessel 12 is shown to include a head 26 which closes the front end of the vessel and supports a tube 28 with the aid of a stiff vertical diaphragm 30 secured to the vessel 12 at the periphery of the head. The tube 28 extends outwardly through and beyond the head 26 and is closed by a plate 32 which serves both as a plug to seal the inner vessel 12 and a brace to strengthen the tube. A reinforcing plate 34 is secured to the outer surface of the head 26 where the tube 28 passes through the head. The tube 28 is welded to the stiff diaphragm 30 and the head 26 including the reinforcing plate 34 to retain the parts in the assembled relationship.

A relatively flexible stainless steel diaphragm 36 is disposed vertically in the space 38 between the outer and inner vessels 10 and 12 at the front 22 of the container. The diaphragm 36 carries a sleeve 40 which surrounds the tube. The sleeve 40 on its inner surface 42 carries a plastic sleeve bearing 44 that may be made of a phenolic resin, epoxy, fluorocarbon, or some other similar material which has self lubricating properties. In FIG. 2 the annular plastic bearing 44 is shown to support the tube 28 secured to the head of the inner vessel. A pair of rings 46 disposed on either side of the bearing 44 retain the bearing within the sleeve 40 as is shown in detail in FIG. 3.

In FIG. 2 a fifth wheel plate and structure 48 is shown welded to the front lower end of the outer vessel 10 and carries king pin 50. It will be appreciated that the plate and structure 48 along with the pin 50 form no part of the present invention.

As suggested in the introduction, the temperature difference between the inner and outer vessels may be in the range of 400° F. when the system is in use filled with a liquified gas. The spaces 16 and 38 between the vessels is evacuated so as to effectively insulate the vessels from one another. After evacuation, it is common practice in the art to fill the space with a fine powder. In order to prevent the powder from interfering with the proper functioning of the support structure 24, a fiberglass pad 52 is secured by pins 54 to the diaphragm 36 and surrounds the bearing 44, tube 28 and related structure. The pad prevents the fine powder from increasing the friction between the parts, which would increase their wear and impair their operation.

The support structure 24 provides radial support for the inner vessel 12 in the outer vessel 10. As suggested in the introduction, the relative displacement of the inner and outer vessels during cool-down may approximate one inch, and the support provided for the inner vessel must be capable of allowing such displacement without imposing great stresses upon the vessel walls. The self lubricating plastic bearing 44 which supports the tube 28 allows the tube to slip as the inner vessel shrinks under extreme cooling. During cooling, the inner vessel is relatively light and therefore the frictional coupling between the bearing 44 and the tube 28 is relatively small. Consequently, the tube 28 is able to slip on the bearing 44, and minimum stress is transferred through the diaphragm 36 to the head of the outer vessel 12. Similarly, minimum stresses are applied to the diaphragm 30 and head 26 of the inner vessel. Moreover, because the inner vessel is relatively light, little wear is imposed on the bearing 44, but when the vessel is loaded, slippage between the tube 28 and the bearing 44 would cause significant wear of the parts. The flexible diaphragm 36 is designed to accommodate axial displacement of the inner vessel 12 in the loaded condition resulting from load stretching of the tank, road motion, etc. Diaphragm deflection 36 requires no relative motion between the ring bearing 44 and the sleeve 28 and therefore no wear occurs.

It will be appreciated from the foregoing description that the support structure 24 provides the necessary radial support for the inner vessel 12 while minimizing the heat path between the inner and the outer vessels as well as the weight of the structure. It will be appreciated that the tube 28, diaphragm 36, outer sleeve 40 and bearing 44 are of relatively light weight and therefore do not add appreciably to the gross weight of the assembly. The thin cross section of the parts provides a poor heat conducting path between the inner vessel and the outer vessel, and the plastic bearing 44 acts as a heat insulator between the inner and outer vessels to prevent the flow of heat through the structure.

What is claimed is:

1. A cryogenic container comprising:
   a horizontally disposed cylindrical outer vessel closed at each end,
   a horizontally disposed cylindrical inner vessel closed at each end and disposed in and with its walls spaced from the walls of the outer vessel,
   a support tube secured to the outer face of one end of the inner vessel,
   a bearing disposed within the outer vessel, said bearing receiving and carrying the support tube so that said tube is permitted to slide within the bearing when the inner vessel moves relative to the outer vessel as the inner vessel is cooled,
   spring means disposed at one end of the outer vessel and secured to said outer vessel and carrying the bearing, said means deflecting to take up motion of the inner vessel relative to the outer vessel when the inner vessel is loaded, and
   a second support for the inner vessel in the outer vessel remote from the bearing.

2. A cryogenic container as described in claim 1 and further characterized by said bearing being annular and surrounding the support tube.

3. A cryogenic container as described in claim 2 and further characterized by said spring means being a diaphragm disposed in a substantially vertical plane.

4. A cryogenic container as described in claim 2 and further characterized by said bearing being made of a heat insulating material.

5. A cryogenic container as described in claim 2 and further characterized by
   said tube and bearing being oriented with their axes disposed horizontally, and
   said spring means being a diaphragm disposed in a substantially vertical plane.

6. A cryogenic container as described in claim 5 and further characterized by said inner and outer containers being generally cylindrical in shape and coaxial, and the tube and bearing being coaxial with the vessels.

7. A cryogenic container as described in claim 2 and further characterized by said bearing being made of a self lubricating and heat insulating material.

8. A cryogenic container as described in claim 7 and further characterized by said bearing being a sleeve, said support a tube slidable in said sleeve and said sleeve and tube being disposed with their axes substantially horizontal.

9. A cryogenic container as described in claim 8 and further characterized by a protection cover surrounding the tube and sleeve for preventing foreign particles from coming in contact with them.

References Cited

UNITED STATES PATENTS

| 1,607,071 | 11/1926 | Gleason | 220—15 |
| 2,823,822 | 2/1958 | Altman | 220—15 |
| 2,858,136 | 10/1958 | Rind | 220—15 X |
| 2,874,865 | 2/1959 | Canty et al. | 220—15 |
| 3,163,313 | 12/1964 | Reynolds et al. | 220—15 |
| 3,191,795 | 6/1965 | Molnar | 220—14 |

THERON E. CONDON, *Primary Examiner.*

JAMES R. GARRETT, *Assistant Examiner.*